Sept. 20, 1966 R. M. LURIE ETAL 3,274,029
RECOVERING WATER FORMED IN A FUEL CELL AND APPARATUS THEREFOR
Filed Sept. 12, 1962
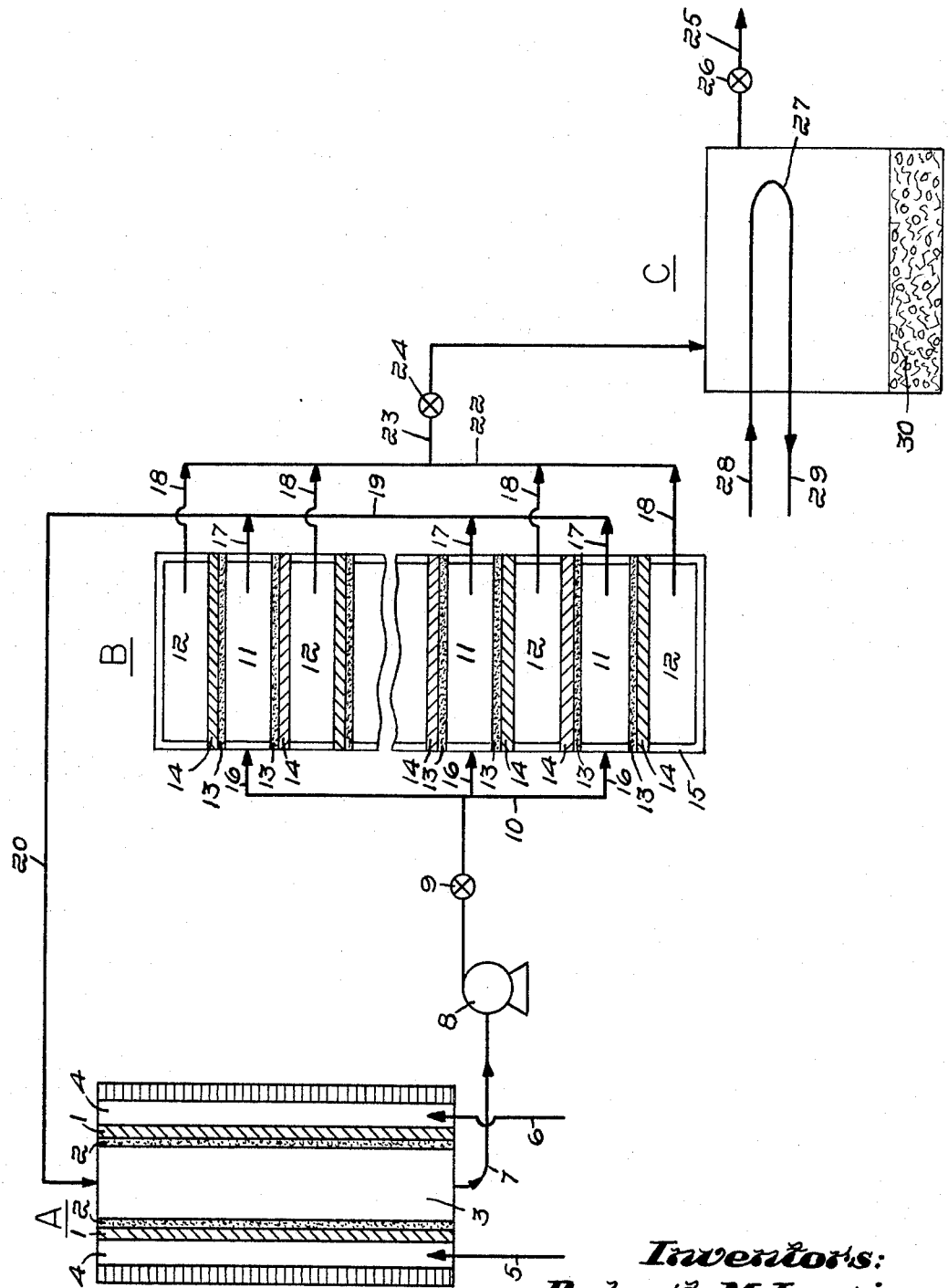
Inventors:
Robert M. Lurie,
David J. Goldstein,
by
Attorney 3,274,029
RECOVERING WATER FORMED IN A FUEL CELL AND APPARATUS THEREFOR
Robert M. Lurie, Waltham, Mass., and David J. Goldstein, Haifa, Israel, assignors to Ionics, Incorporated, Cambridge, Mass., a corporation of Massachusetts
Filed Sept. 12, 1962, Ser. No. 223,010
12 Claims. (Cl. 136—86)

This invention relates to methods and apparatus for the separation of potable water from corrosive or poisonous solutions by membrane distillation. In particular, it concerns the removal of synthesized water formed in the electrolytic solutions employed in fuel cells. Specifically, it is directed to the recovery of water produced in fuel cell reactions in space flight operations where conditions of zero gravity are encountered.

For the purpose of supplying the power needs required during space flight, a wide variety of fuel cells is being investigated. A fuel cell is a device which converts the energy of a chemical reaction between a fuel and oxidant material directly into low-voltage, direct current electricity. Such a typical fuel cell consists of: (1) two porous electrodes impregnated with a catalytic material, (2) an ion-conducting electrolyte therebetween which can be a liquid and/or a solid substance, and (3) separate electrode chambers for introducing a fuel and oxidant material into opposite sides of the cell. Some fuel cells employ a hydrogen ion-producing fuel at the anode and an oxygen ion-producing material at the cathode. For space-flight purposes, the use of a hydrogen-oxygen gas type cell has advantages; namely, high theoretical power output and water as the waste product of the overall cell reaction which, if recovered as potable water, can be consumed by the space craft crew.

As will hereinafter be described, the method of recovering water according to this invention is particularly adaptable to fuel cells employing a molten or liquid electrolyte and whose cell reaction produces water as a by product. Since this water, formed during cell operation, dilutes the electrolyte concentration, it is necessary to remove this water thereby preventing a decrease in the cells efficiency.

A cell which appears to be especially adapted for use in the present invention for space flight purposes is the hydrogen-oxygen dual membrane fuel cell described in U.S. Patents Nos. 3,152,015 and 3,152,014. Such a cell employs an ion-exchange membrane in intimate contact with each catalytic, porous electrode, and has liquid electrolyte enclosed within the chamber defined by the two membranes. The membranes themselves also act as solid electrolytes. Depending on the method of operation, product water is formed at one or the other of the electrodes and due to the osmotic pressure of the electrolyte, the water will pass through the membrane into the electrolyte chamber. The resulting dilution of the electrolyte causes a decrease in cell performance and removal of the diluting water is a required procedure. In addition, a fuel cell produces much heat during operation, which should also be removed to prevent any possibility of over-heating.

One method of removing the product water is to recirculate a dry fuel or oxidant gas throuph the gas chamber, into a condenser and back to the chamber. Since water is the only volatile component, it is carried out of the chamber with the gas as a water vapor, liquefied in the condenser, and the relative dry gas is then returned to the gas chamber. This process presents several difficulties—one of which is pressure equalization between the fuel and oxidant feed gases during the time one gas is recirculated. This disadvantage is very evident in fuel cells employing a liquid electrolyte without ion-exchange membranes. Such a cell requires complex pressure controls. Another drawback, especially for space flight purposes, is the increased weight and inefficiency of gas recirculating equipment. Also, since gravity is not present, the entrapment and removal of condensed water droplets carried in the stream of gas, becomes complex. Either a centrifugal force must be employed to simulate gravity in order to maintain a liquid-vapor phase, or the moist gas stream must be filtered in the latter case, the pressure drop through the filter becomes an added load on the recirculating pump equipment.

The present invention is a simplified method of removing excess heat and product water from a liquid or molten electrolyte fuel cell. The water, by the present invention, can be selectively removed from the liquid electrolyte through a semi-permeable membrane without the need of gravity and without the disadvantages of other methods referred to above. This novel process is termed "membrane distillation" herein, and as used in this disclosure defines a process for maintaining a liquid-vapor interface for separating water from dissolved solutes. It involves the passage of water through a hydrophilic semi-permeable membrane. While it is not desired to limit this invention by any particular theory of operation, it is believed that the distillation or evaporation of water through a hydrophilic membrane may be explained by the fact that the water dissolves in the membrane on the side at which the higher partial pressure of water vapor exists. The dissolved molecules then diffuse through the membrane by non-capillary diffusion and pass to the opposite side of the membrane (from the solution phase into the vapor phase) where a lower partial pressure of the water vapor exists. This function will continue as long as a difference in partial pressure of the water exists between the two sides of the membrane. The method is accelerated by removing the vapor leaving the side of the membrane, for example by sweeping it away or by condensing. The membranes employed in the present invention may preferably be in the form of sheets so that the liquid electrolyte is confined between the surface on one membrane sheet and another surface, or between two membrane sheets. The membranes may also be in the form of tubes which may be circular, square or rectangular in cross section. The membranes employed are solid, organic, relatively non-porous barriers which when placed between a liquid and gas phase allow the passage of water therethrough while partially or substantially hindering the passage of dissolved solute. Thus the term "semi-permeable" as applied to membranes, designates a membrane selectively permeable to the water of the electrolyte solution (in contact with such membrane) but which is substantially impermeable to the dissolved salts of that solution. The membranes are essentially non-porous; that is, they are free from holes, tears, etc. which would destroy the continuity of the membrane surface and allow the electrolyte to leak therethrough. The membranes are of a plastic type material and preferably are as thin as possible—depending on the operating conditions employed.

It is therefore the general object of this invention to provide a novel membrane distillation apparatus and an improved process for the continuous separation of water from corrosive or poisonous aqueous solutions. A primary object is to achieve water and heat removal from electrolytic solutions employed in operations of electric power-producing fuel cells during space flight conditions of zero gravity which avoid the disadvantages inherent in known processes of distillation or evaporation. A further object is to provide such a method and apparatus wherein the resulting water collected is reasonably safe for human consumption. Another object is to provide a method for concentrating an electrolyte solution in a continuous manner by use of semi-permeable membranes.

The following description and appended claims contain various details identified by specific names; however, the names are intended to be as general in their application as the art will permit. Like numerals denote like parts in the drawing. It is understood that details may be modified without departure from the principle of the invention. Additionally, the invention may be applied to and practiced by structures other than the ones shown. The principles and features of the invention are readily understood by first considering the basic structure of the apparatus for practicing the same taken in connection with the accompanying drawing.

The drawing is a diagrammatic representation in verticle cross section of one embodiment of a membrane distiller used in conjunction with a fuel cell for mechanically separating water from the liquid electrolyte of such a fuel cell especially under conditions of zero gravity.

As may be seen from the drawing, fuel cell A (which for purposes of this illustration is a dual membrane type) is the source of the electrolyte solution being fed to a membrane distillation apparatus B. The water which is separated or distilled from the electrolyte solution as a vapor, is condensed and collected in collection vessel C. The remaining electrolyte solution which contains less water is recirculated back to the fuel cell for reuse.

More specifically the dual membrane fuel cell A comprises, in its simplest form, two catalytic porous electrodes 1, each having an adjacent ion-exchange membrane 2 in direct contact thereto. The two membranes define a liquid chamber 3 therebetween which contains an electrolyte solution. One surface of each porous electrode faces the gas chamber 4. The required gases, such as hydrogen and oxygen, enter the gas chambers by inlet means 5 and 6, respectively, from a source not shown. The liquid electrolyte chamber 3 is provided with electrolyte outlet means 7 which passes through pumping means 8, through pressure relief valve 9 and into manifold 10 which splits into feed lines 16. Each feed line 16 feeds into the distillation chambers 11 of the membrane distillation apparatus B. The distillation apparatus comprises a plurality of distillation chambers 11 and vapor chambers 12. These chambers are arranged in an alternate sequence to form a multi-chamber stack. Each distillation chamber is defined on either side by semi-permeable membranes 13 which are supported against porous boards, screens, or sheets 14 comprised of a non-corroding material such as plastic or metal. These support sheets 14 are adjacent to and in direct contact with each membrane and define the vapor chambers 12. The support sheets prevent any tendency of the membranes to burst under pressure of the electrolyte solution contained in the distillation chambers 11. The membranes and support sheets are held in a frame 15, said frame provided with feed inlets 16 to the distillation chambers, outlets 17 from said chambers and outlets 18 from the vapor chambers. Thus vapor chambers 12 are completely sealed off from the adjacent distillation chambers 11 thereby insuring that water entering the vapor chambers can occur only by passage through the separating membranes. The outlets 17 from the distillation chambers 11 pass into manifold 19 which connects with return line 20 to the fuel cells electrolyte chamber 3. Outlets 21 from vapor chambers 12 lead to manifold 22, which is connected to collection line 23. The collection line, connected to the water product collection vessel C, is provided with a safety shut-off valve 24. Any vacuum employed in the vapor chambers 12 of the membrane distillation apparatus is provided for at vacuum line 25 (through valve 26) by vacuum means not shown. The product collection vessel is provided in its upper section with a condenser 27 of the conventional type in which a coolant may be recirculated if desired (as shown by pipes 28 and 29). The bottom section of the vessel may be provided with sponges 30 for collecting the water product as desired.

The operation of the apparatus may be described by referring to the drawing as follows.

An electrolyte solution, for example KOH, is passed into line 7 from its source which, for purposes of this illustration, is a dual-membrane fuel cell A, by pressure means such as pump 8. The solution then passes through pressure relief valve 9 into manifold feed line 10 which splits into a plurality of parallel feed lines 16 into distillation chambers 11 of the membrane distillation apparatus B. The temperature of the electrolyte solution is preferably maintained hot, for example 200° F. Due to the inefficiency of the fuel cell during its operation, the electrolyte solution contained therein will absorb heat which may be sufficient to reach the required temperature. Where additional heating of the electrolyte is necessary, conventional heating means (not shown) may be employed. At a temperature of 200° F., the electrolyte solution entering the distillation chambers will possess a vapor pressure of about 12.4 p.s.i.a. The pressure in the vapor chambers 12 is always maintained at a lower pressure than that in the distillation chambers 11. This lower pressure may be obtained by controlling the temperature in the water product collector vessel C using cooling means such as a condenser 27, or alternately by producing a partial vacuum in the vessel as by evacuation at line 25. The temperature in the collection vessel should be such that the vapor pressure of the water therein is preferably at least one-half the vapor pressure of the electrolyte in the distillation chambers. For example, a coolant may be recirculated through the condenser 27 at pipes 28 and 29 to lower the temperature therein to 170° F. This in turn will produce a water vapor pressure in the collection vessel of about 6 p.s.i.a. In operation excess water from the electrolyte solution contained in the distillation chambers 11 passes through the semi-permeable membrane 13, with the KOH being substantially held back. The water emerges from the other side of the membrane as a vapor. The vapor then passes through the porous support material 14 and into the vapor chambers 12, where it is withdrawn through outlets 18. The water vapor then combines in manifold 22; passing through line 23 and through safety shut-off valve 24. It thence goes into the product collection vessel C where it is condensed and collected. If the water is collected under conditions of zero gravity, collection means such as sponges 30 are employed in the lower section of the collection vessel C to hold the condensed water. An alternate method of collecting the water would be by centrifuging means (not shown).

Various pin-hole-free water permeable plastic films or membranes may be used to transfer water from an electrolyte solution. Some of these include membranes of cellulose esters, such as the acetate and butyrate type (or mixtures of both), polyvinyl alcohol, polyvinyl esters—such as hydrolyzed polyvinyl acetate, polyacrylonitrile, methyl, or ethyl cellulose and the like. Although the electrolytes used in fuel cells are usually strong bases or acids, the membrane employed does not necessarily require complete stability in the electrolyte solution. During operation only one surface of the membrane is in contact with the hot electrolyte, and the steady transfer of water therethrough affords reasonable protection to the bulk of the membrane. A particularly novel and advantageous membrane for water passage is ion-exchange membranes which are well known in the art and readily available commercially. Suitable cation or anion membranes and methods for making the same are disclosed in U.S. Patents No. 2,730,768, No. 2,731,408, No. 2,731,411, No. 2,732,-350, and No. 2,756,202. These membranes have the advantage of being highly hydrophilic and possess substantial strength and stability in highly corrosive inorganic solutions. These ion-exchange membranes, when operated under conditions described hereinabove, behave as selective absorbers of water. So long as water vapor collecting on one side of the membrane is rapidly removed, a product water substantially free of electrolyte will be obtained. The membrane used should be as thin as is consistent with the strength required. Membrane sheets of 0.1 to 40 mils may be used, but 1 to 10 mils is preferred. The thin membranes require backing or supporting means to minimize possible rupturing. Such supports can be constructed of porous, non-corroding materials, for example ceramics, plastics, or the like. The membranes employed are hydrophilic; that is, they have a composition in which water is soluble. The separation of water proceeds efficiently only if the distillation chambers 11 are completely filled with electrolyte solution so that the liquid alone is in contact with one side of the membrane at all times. Where there is a vapor contact on this membrane surface, the rate of separation drops radically. Reasonably good surface contact is assured by good mixing of the electrolyte solution and by the maintenance of a pressure gradient across the chambers (i.e., a recirculating pump 8). It is preferable for the hot electrolyte solution to pass through the distillation chambers 11 under turbulent flow. The electrolyte solution is withdrawn from the distillation chambers through outlets 17 where it combines in manifold 19. It is then recirculated back through line 20 into the electrolyte chamber of fuel cell A as a more concentrated solution. The heat required for the vaporization or distillation of the water is supplied from the heat content of the hot electrolyte solution which, of course, drops in temperature as it passes out of the distillation chambers. Due to the inefficiency of a fuel cell, sufficient heat may be generated therein to maintain the recirculating electrolyte at the desired high temperature—otherwise additional heating means may be employed. The recirculating electrolyte also serves the function of dissipating heat away from the fuel cell thereby preventing undue overheating. It is essential that the water vapor emerging at the vapor side of the membrane be removed. The reduced pressure is required in the vapor chamber to efficiently remove the vapor phase therein. The creation of the necessary pressure differential on both sides of the membrane is preferably obtained by controlling the temperatures in the distillation and vapor chambers and/or creating a partial vacuum in the vapor chambers. It is also preferable that, prior to actual operation, the product water collection vessel be evacuated as at line 25 to remove any non-condensible gases therein, and then the vessel be sealed off by means of vacuum valve 26. Where the apparatus of this invention is employed in space flight, the required evacuation can be accomplished by employing the vacuum of space at line 25.

Where the product water is used for human consumption, it can be monitored for purity, for example by conductivity measurements. The number of distillation and vapor chambers employed in a membrane distillation unit can vary depending on the volume of water required to be separated from the electrolyte solution. The distillation apparatus can be used in conjunction with a single fuel cell or with multiple groups. A plurality of consecutive distillation units may be used to effect a high degree of separation in which case the effluent water from one unit serves as the feed material to the next unit and so on.

The following examples show by way of illustration and not by way of limitation the invention disclosed herein.

*Example 1*

A membrane distillation unit employing 23 mil thick cation-exchange membranes of sulfonated copolymers of styrene and divinyl benzene was used to separate water from a 6 N sulfuric acid solution. The membranes were supported on highly porous rigid sheets of Lucite. The electrolyte solution was recirculated at a constant temperature through the distillation chambers by means of a pump. A partial vacuum was maintained in the vapor chambers to obtain the necessary pressure differential across the membranes. Four runs were performed—each run operating for one hour at which time the condensed water vapor was collected and measured. The results are shown in the following chart:

| Run | Temp. of $H_2SO_4$ | $H_2SO_4$ Recirculation Rate, ml./min. | Pressure in Vapor Chambers, mm. of Mercury | Ml. of Water Collected per Hour per sq. cm. of Membrane Area | pH of Water |
|---|---|---|---|---|---|
| 1 | 31 | | 3 | 0.16 | 3.8 |
| 2 | 80 | 45 | 10 | 0.42 | 4.4 |
| 3 | 80 | 64 | 10 | 0.54 | 3.3 |
| 4 | 97 | 64 | 12 | 0.83 | 2.1 |

*Example 2*

A membrane distillation unit of the type illustrated in the drawing was employed with a 2 kw. dual membrane fuel cell. The fuel cells electrolyte comprised a 6 N NaOH solution. The gases employed at the porous electrodes were hydrogen and oxygen. The fuel cell operated at 0.85 volt and at a temperature of 205° F. The distillation unit employed anion-permeable ion-exchange membranes (3 mils thick) with a total area of 3.5 square feet (3255 cm.$^2$) in contact with the basic solution. These anion membranes were made of a quaternized copolymer of 2-vinyl pryridine and divinyl benzene. The hot base was continuously recirculated through the distillation chambers and then back to the fuel cells electrolyte chamber with the temperature in the distillation chamber maintained at 200° F. corresponding to a vapor pressure of 12 p.s.i.a. A coolant was circulated through the condenser to maintain a temperature in the collection vessel of 170° F. (6 p.s.i.a.). After one hour of continuous operation, 770 milliliters of water were separated from the basic solution corresponding to 0.24 milliliter of water per hour per cm.$^2$ of membrane area. The concentration of base in the fuel cells electrolyte chamber stayed between 5.95 and 6.10 N during the course of operation. The water product collected was sufficiently free of base so as to be safe for human consumption.

*Example 3*

The same apparatus and operating conditions used in Example 2 were employed to remove synthesized water formed in a 6 N $H_2SO_4$ fuel cell electrolyte solution. A change was made in the distillation apparatus in that the ion-exchange membranes employed therein were replaced with a non-ion-exchange plastic membrane. These membranes were made of polyvinyl alcohol and possessed a thickness of 5 mils. The product water transferred out of the electrolyte solution at a rate of 0.37 milliliters per hour per cm.$^2$ of membrane area. The bulk pH of the total volume of product water collected during one hour of operation had a pH of 4.2.

Since certain changes may be made in the above apparatus and process without departing from the scope of the invention herein involved, it is intended that all matter contained in the above description as shown in the accompanying drawing shall be interpreted as illustrative and not in a limiting sense.

What is claimed is:

1. The method of recovering potable water from the electrolyte solution of a fuel cell for use under space flight conditions, said water being formed therein by the reaction of a fuel and oxidant material comprising: passing said electrolyte under pressure into alternate distillation chambers of a membrane distillation unit, said distillation chambers being separated and defined from the adjacent alternate vapor chambers by semi-permeable membranes, said membranes consisting of a hydrophilic organic plastic material selectively permeable to water and substantially impermeable to dissolved salts, maintain at least a partial vacuum in said vapor chambers causing water of the electrolyte solution to pass through said membranes into said vapor chambers as a water vapor therein, withdrawing said vapor from said vapor chambers, and condensing said vapor to recover the water.

2. The method of claim 1 wherein the electrolyte of the distillation chambers is withdrawn and recirculated back to the electrolyte of said fuel cell.

3. The method of claim 1 wherein said plastic material is polyvinyl alcohol.

4. The method of claim 1 wherein said semi-permeable membrane is an ion-exchange sheet.

5. The method of claim 1 wherein the partial vacuum in the vapor chambers is obtained by maintaining a lower temperature in said chambers than in the distillation chambers.

6. The method of claim 1 wherein the electrolyte solution is an acid.

7. The method of claim 1 wherein the electrolyte solution is a base.

8. The apparatus for recovering potable water formed in the electrolyte of a fuel cell for use under space flight conditions, said cell comprising spaced porous catalytic electrodes having an electrolyte solution between the same and comprising: the combination of said fuel cell with a membrane distillation unit provided with means for withdrawing the electrolyte from said fuel cell into a manifold with means for passing said electrolyte into alternate distillation chambers of said distillation unit, said distillation chambers being separated and defined from the adjacent alternate vapor chambers by semi-permeable membranes, said membranes consisting of hydrophilic organic plastic material selectively permeable to water and substantially impermeable to dissolved salts, means for maintaining at least a partial vacuum in said vapor chambers, means for withdrawing the electrolyte from said distillation chambers and recirculating the same back to the electrolyte chamber of said fuel cell, means for withdrawing the water vapor passing into said vapor chamber from said distillation chambers, and means for recovering the same for further use.

9. The apparatus of claim 8 wherein the semi-permeable membranes are organic plastic films of polyvinyl alcohol.

10. The apparatus of claim 8 wherein the semi-permeable membranes are ion-exchange membranes.

11. The apparatus of claim 8 wherein the membranes are in contact on their vapor chamber side with a porous supporting structure.

12. The apparatus of claim 8 wherein the water recovering means is a condenser.

References Cited by the Examiner
UNITED STATES PATENTS

| | | | |
|---|---|---|---|
| 2,384,463 | 9/1945 | Gunn et al. | 136—86 |
| 2,609,341 | 9/1952 | Juda | 260—2.2 |
| 2,700,063 | 1/1955 | Manecke | 136—153 |
| 2,702,272 | 2/1955 | Kasper | 136—153 |
| 3,129,146 | 4/1964 | Hassler. | |
| 3,152,015 | 10/1964 | Tirrell | 136—86 |

WINSTON A. DOUGLAS, *Primary Examiner.*

JOHN H. MACK, *Examiner.*

H. FEELEY, A. B. CURTIS, *Assistant Examiners.*